United States Patent
Krebs

(10) Patent No.: US 6,253,157 B1
(45) Date of Patent: Jun. 26, 2001

(54) METHOD FOR EFFICIENT MANUAL INVERSION OF SEISMIC VELOCITY INFORMATION

(75) Inventor: Jerome R. Krebs, Houston, TX (US)

(73) Assignee: ExxonMobil Upstream Research Co., Houston, TX (US)

(*) Notice: Subject to any disclaimer, the term of this patent is extended or adjusted under 35 U.S.C. 154(b) by 0 days.

(21) Appl. No.: 09/451,806

(22) Filed: Dec. 1, 1999

Related U.S. Application Data

(60) Provisional application No. 60/112,177, filed on Dec. 14, 1998.

(51) Int. Cl.⁷ ........................................ G01V 1/28
(52) U.S. Cl. .................................. 702/18; 367/73
(58) Field of Search .................... 702/14, 16, 17, 702/18; 367/73

(56) References Cited

U.S. PATENT DOCUMENTS

| | | | |
|---|---|---|---|
| 4,984,220 | 1/1991 | Bodine et al. | 367/68 |
| 5,513,150 | 4/1996 | Sicking et al. | 367/73 |
| 5,583,825 | * 12/1996 | Carrazzone et al. | 702/17 |
| 5,696,735 | 12/1997 | Krebs | 367/50 |

FOREIGN PATENT DOCUMENTS 1 399 904    2/1975 (GB) .............................. G01V/1/28

OTHER PUBLICATIONS

Lines, L. "Applications of tomography to borehole and reflection seismology," *Geophysics: The Leading Edge of Exploration*, 10(7), (Jul. 1991) pp. 11–17.

Sheriff, R.E. "*Encyclopedic Dictionary of Exploration Geophysics*", Society of Exploration Geophysics, Third Edition, (1991) pp. 87, 316–318.

Wernecke, J. "*The Inventor Mentor*", Silicon Graphics, Inc., 1994, p. XIII, XV, XVIII, XCX, XXC, XXIII, XXV.

* cited by examiner

*Primary Examiner*—Donald E. McElheny, Jr.
(74) *Attorney, Agent, or Firm*—J. Paul Plummer

(57) ABSTRACT

A method for calculating seismic velocity for migration purposes as a function of subsurface spatial position that gives the seismic processing analyst direct control of the resulting migration velocity model, and includes a means to ensure that the model is consistent with RMS velocity sweeps computed from available surface seismic or other data. The method involves generating average velocities from the model to compare to the measured RMS velocity data, and comparing the model predictions to actual data on a 3-D interactive visual display allowing quick and easy model adjustment. Other available measured data besides surface seismic data maybe used to develop the model.

18 Claims, 5 Drawing Sheets

METHOD FOR EFFICIENT MANUAL INVERSION OF SEISMIC VELOCITY INFORMATION

This application claims benefit of Provisional No. 60/112,177 filed Dec. 14, 1998.

FIELD OF THE INVENTION

This invention is in the field of oil and gas exploration. More specifically, it is directed to constructing velocity models for time- or depth-migration of seismic data.

BACKGROUND OF THE INVENTION

Sophisticated seismic migration programs require velocity models in terms of instantaneous velocity (the velocity of seismic waves at a particular location in the earth). Unfortunately, no means exist for directly measuring this instantaneous velocity in the frequency band of seismic data. Instead one gathers data, which are indirectly sensitive to instantaneous velocity, and then inverts these data to determine the migration velocity model. Table 1 lists the types of data that are conventionally gathered and their relationship to the instantaneous velocity ($v_{inst}$).

TABLE 1

Types of data gathered for estimating instantaneous velocity and their relationships to instantaneous velocity.

| Data Gathered | Approximate Relation to Instantaneous Velocity |
|---|---|
| Surface Seismic | Root-Mean-Square average of $v_{inst}$ from surface |
| Vertical Checkshot | Average of ($1/v_{inst}$) from surface |
| Sonic Log | $v_{inst}$ but far outside the seismic frequency band |
| Offset Checkshot | Average of $1/v_{inst}$ along migration ray paths |

Excepting sonic logs, the sources of velocity information depend on some running average of the instantaneous velocity. Thus, these measurements are heavily filtered versions of the needed information and converting these measurements to instantaneous velocity is an unstable process. Small errors in the measurements produce large errors in instantaneous velocity.

[Note—where checkshots are the source of the measured "velocity" data or information, such data or information will actually be traveltimes, not velocities; however, for purposes of this patent application, the term "measured velocity data" and equivalent or similar terms will be understood to include or mean traveltime data in the case of checkshots, and conversely terms such as "model-predicted velocity data" will be understood to include or mean traveltimes calculated from the velocity model where the context requires. Such traveltimes are determined by tracing ray paths in the velocity model, starting at the checkshot source and proceeding to the checkshot receiver. Similarly other types of available data may be used to constrain velocity models, e.g. well tops data, which are distances from the surface to various rock layers, as measured in a well bore. All such approaches are intended to be within the scope of the present invention.]

It would be desirable to incorporate all of these sources of velocity information when developing migration velocity models, because the strengths of one source often offset the weaknesses of another. Unfortunately, the different sources of velocity information usually give inconsistent estimates of the instantaneous velocity. This inconsistency may be due to some physical principle that is being ignored (e.g., anisotropy), or it may be simply due to the instability encountered when converting from the measured velocity information to instantaneous velocity. The latter situation requires velocity estimation methods that are robust with respect to these instabilities.

The conventional method for converting from the velocity one can measure to instantaneous velocity begins by picking the velocity information as a function of depth. This is a process first of interpretation, primarily distinguishing signal from noise, and then digitizing the data. In the case of surface seismic data, the velocity information will be RMS velocity, and for vertical checkshot data, it will be vertical traveltime. These measurements are then converted to instantaneous velocity by using an analytic formula. For surface seismic velocities, the formula is the Dix equation. This process tends to be unstable, such that small errors in the measured velocity data can generate relatively large errors in the calculated instantaneous velocity. For vertical checkshot measurements, the instantaneous velocity is simply the depth derivative of the measurements. As with the Dix equation, applying a derivative to the measured data is an unstable process. Moreover, it is typical to find that the different sources of velocity information yield different values for the instantaneous velocity. To overcome this problem, one of the information sources is usually picked and the others discarded, or an ad hoc calibration adjustment may be developed to make the sources agree. The resulting velocity model usually has unreasonably large vertical and lateral variability, so it is necessary to smooth the model.

There are three problems with this conventional velocity model building method:

1. The ad hoc calibration may be simply correcting for the fact that the conversion to instantaneous velocity is unstable. If that is the case, the calibration is unlikely to be accurate.

2. After smoothing, the model may no longer be consistent with the measured velocity information. Even worse, it is difficult to control the smoothing in a geologically reasonable manner. Typically, only the lengths of the smoothing operators can be controlled. This method gives no direct control over the migration velocity model.

3. This method requires picking velocities at a large number of locations so that the smoothing process is statistically reasonable. This picking is a very time consuming process.

Another popular method of converting measured velocity information to migration velocity models is tomography. This method uses an automated minimization approach to find a model that is consistent with all the velocity data. Constraints can be included that force the model to be smooth, usually at little cost to the data fit. This method should avoid the first two pitfalls of the conventional method discussed above. Tomography should be able to find a smooth model that still is consistent with the measured data. Also, incorporating different sources of velocity information into tomography should enhance the resulting model, unless the model does not account for physical causes which make the sources of velocity information inconsistent (e.g., anisotropy). Inconsistency of information, due simply to the instability of the inversion, should not be a problem for tomography.

However, being an automated method, tomography does not give the user direct control over the migration velocity. In particular, this technique may have difficulties in regions of poor seismic data quality. Furthermore, tomographic procedures may be too expensive to apply to three-dimensional (3-D) seismic data. (3-D tomographic inversion methods are not often applied in production processing and are still the subject of a considerable amount of research.)

Thus, when it becomes widely available, tomography may be the method of choice in areas having good data quality. In the meantime less expensive methods, based on manual updating of velocity models, are required.

From the foregoing, it can be seen that an improved method for constructing instantaneous velocity models is needed. Such a method should provide for comparison of model velocities to available velocity data in the latter's domain to avoid inherent instabilities in converting measured data to instantaneous velocity. Such a method should generate a smoothly varying velocity model, thereby eliminating the need to apply artificial smoothing operators, which smooth the model in a geologically unreasonable manner and disrupt consistency with the measured data. Such a method should be manual as opposed to automated, thereby enabling the operator to make decisions such as how to treat regions of poor data quality or how to make simplifying assumptions with minimal loss of accuracy, judgments that are too difficult presently to program into automated methods in a satisfactory way. Because the desired improved method needs to be a manual method, such a method must be fast and efficient, which means that it must involve adjusting velocities at relatively few locations, and which also means that there must be a quick visual and comprehensive method of adjusting the model and comparing it to actual data in order to perfect the model and ensure its conformity to measured data. Moreover, such an improved method must be fast enough to handle large 3-D data sets without the extreme time and expense of present automated methods. The present invention satisfies these needs.

SUMMARY OF THE INVENTION

The present invention is a method for constructing an instantaneous velocity model for seismic waves which predicts seismic velocity as a function of subsurface spatial position, using available measured geophysical or geological data. In one embodiment, the available measured data are surface seismic data, and the method comprises the steps of (a) determining whatever velocity information (called measured information below) that the measured data will yield, which will approximate some sort of running average of the instantaneous velocities; (b) defining a set of model parameters, to include values of instantaneous velocity at selected locations (called velocity nodes), and assigning initial values to these model parameters; (c) interpolating within the velocity model in a way that takes advantage of known geological and geophysical information; (d) transforming the velocity model to the measured information domain (a process called forward modeling) to permit comparison with the measured velocities or other measured information; (e) determining which model velocity node or other parameter should be adjusted to provide maximum improvement to the fit between model and measured data; (f) making such adjustment to the velocity model, then forward modeling again to compare once more with measured data; and (g) repeating steps (e) and (f) until the model fit is deemed satisfactory. The instantaneous velocities thus determined can be used for seismic depth migration and other related purposes.

The parameter adjusting and forward modeling can be done in a 3-D interactive video display that allows quick, efficient model development. Only a relatively few velocity nodes are needed, located throughout the model as indicated by available geological and geophysical data. The sparse set of velocity nodes automatically ensures a smoothly varying velocity model.

BRIEF DESCRIPTION OF THE DRAWINGS

The present invention and its advantages may be better understood by referring to the following detailed description and the attached drawings in which.

Figure 1:
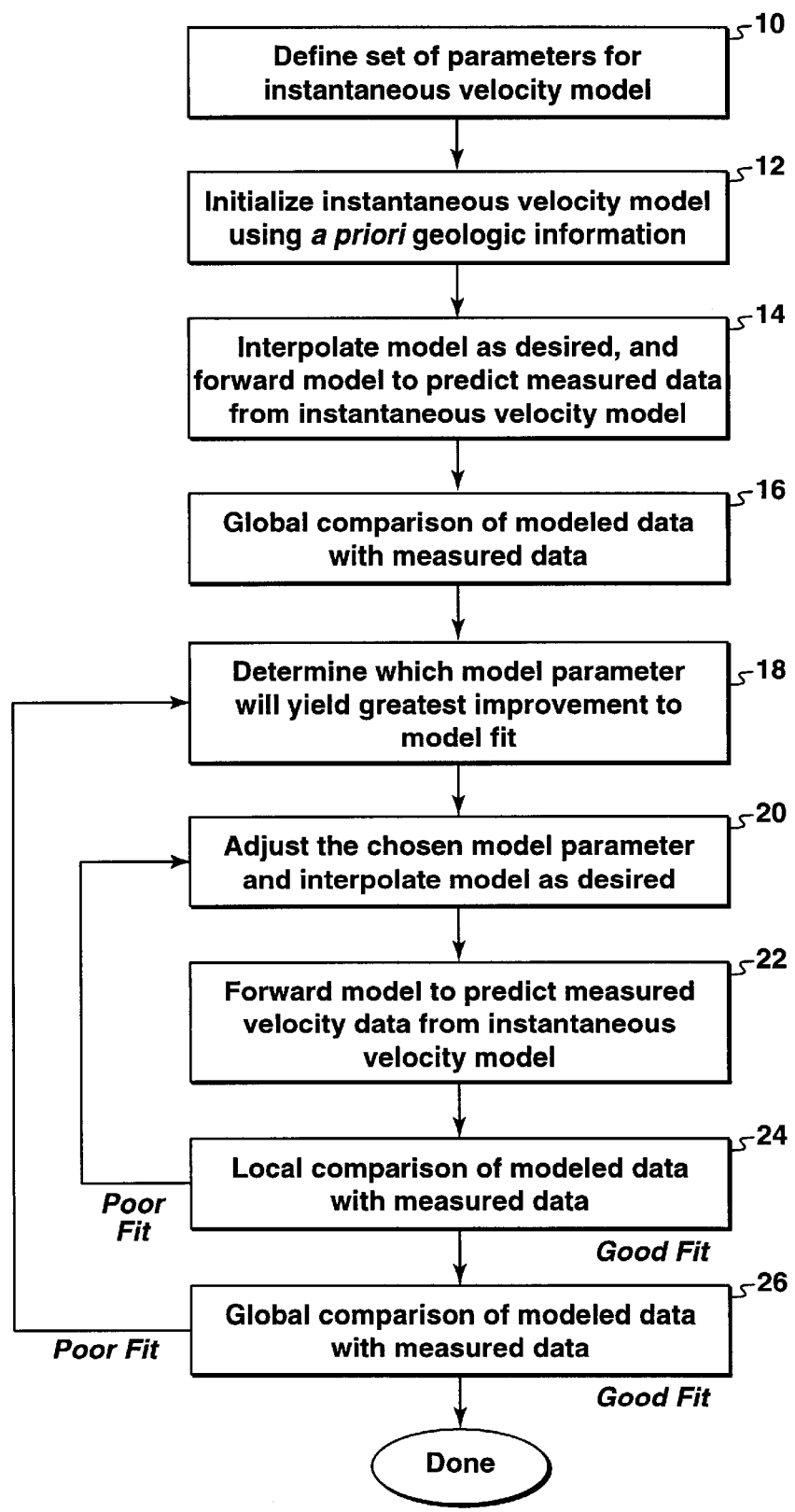
FIG. 1 is a flow chart illustrating the basic steps of one embodiment of the present inventive method for velocity model development.

The invention will first be described generally, followed by a detailed description of the invention's preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the spirit and scope of the invention, as defined by the appended claims.

DETAILED DESCRIPTION OF THE INVENTION

The present invention is a method for efficiently producing seismic velocity models that are geologically reasonable and are consistent with available velocity information. The present invention is based on the following concepts:

Comparisons between the model and measured data are made in the data domain rather than the model domain. This avoids the instability inherent in analytic conversion from the data domain to the model domain used in the conventional method discussed above.

Geologic constraints are incorporated into the model building process. This helps to avoid building models that have more velocity variability than is necessary to match the data.

Velocities are picked at a sparse set of locations (called nodes) and interpolation techniques are used to compute velocities throughout the volume. This reduces the time spent picking velocities and also leads to smoother velocity models.

Tomographic methods can easily satisfy the above concepts, because they efficiently update a large number of parameters in the model in a way that usually improves the model fit. Tomographic methods also can easily measure the degree of model fit globally, rather than one location at a time as is usually done in a manual method. However, the tomographic method is fully automatic, i.e., computerized, whereas many steps of the present method are better performed manually (as will be made clearer in the description to follow) thereby providing (1) less expensive operation and (2) better success in regions of poor seismic data quality, compared to the tomographic method. The hands-on human control is a key to realizing these advantages, but it is not possible to efficiently update large numbers of model parameters using a manual method. Thus, the present invention cannot simply replace the automated updating used in tomography with manual updating. The present invention adheres to the three concepts outlined above and includes the following features, or tools:

Capability to accurately describe seismic velocity with a relatively small number of parameters, (since it is not feasible to manually update large numbers of parameters);

Capability to incorporate a priori geologic information into the model parameterization, so that the initial model is consistent with a priori geologic information and the updated model will be a relatively small perturbation on the initial model;

A method for determining which model parameter will yield the most improvement in model fit after adjustment;

Easy and intuitive method for updating the model parameters in the instantaneous velocity domain;

Fast forward modeling to convert from the model domain to the data domain (or domains) so that the effect of a model update on the model fit-to-data can be seen in a very short time; and The ability to evaluate the fit between the model and data over large regions of the model, rather than just locally at one location.

As will be seen from the detailed description below, this set of tools enables the user of the present invention to efficiently produce a velocity model that is consistent with geologic constraints and whatever velocity measurements are available. Readers who are reasonably skilled in the art will note that this method could also be used to estimate other physical quantities that affect migration such as anisotropy and dispersion.

FIG. 1 is a flow chart illustrating the basic steps in one embodiment of the present inventive method. Implementing the method shown in FIG. 1 involves developing the tools discussed above, and integrating them into a software package. There are many ways to implement these tools in addition to the embodiments described below.

At step 10 of FIG. 1, the model parameters are defined. In this embodiment, the model parameterization will satisfy the following three criteria:

1) Seismic velocities in the earth must be accurately represented using a small number of parameters.

2) A priori geologic information must be easily incorporated in the model.

3) There must be an easy and intuitive method for updating the model parameters.

Figure 2:
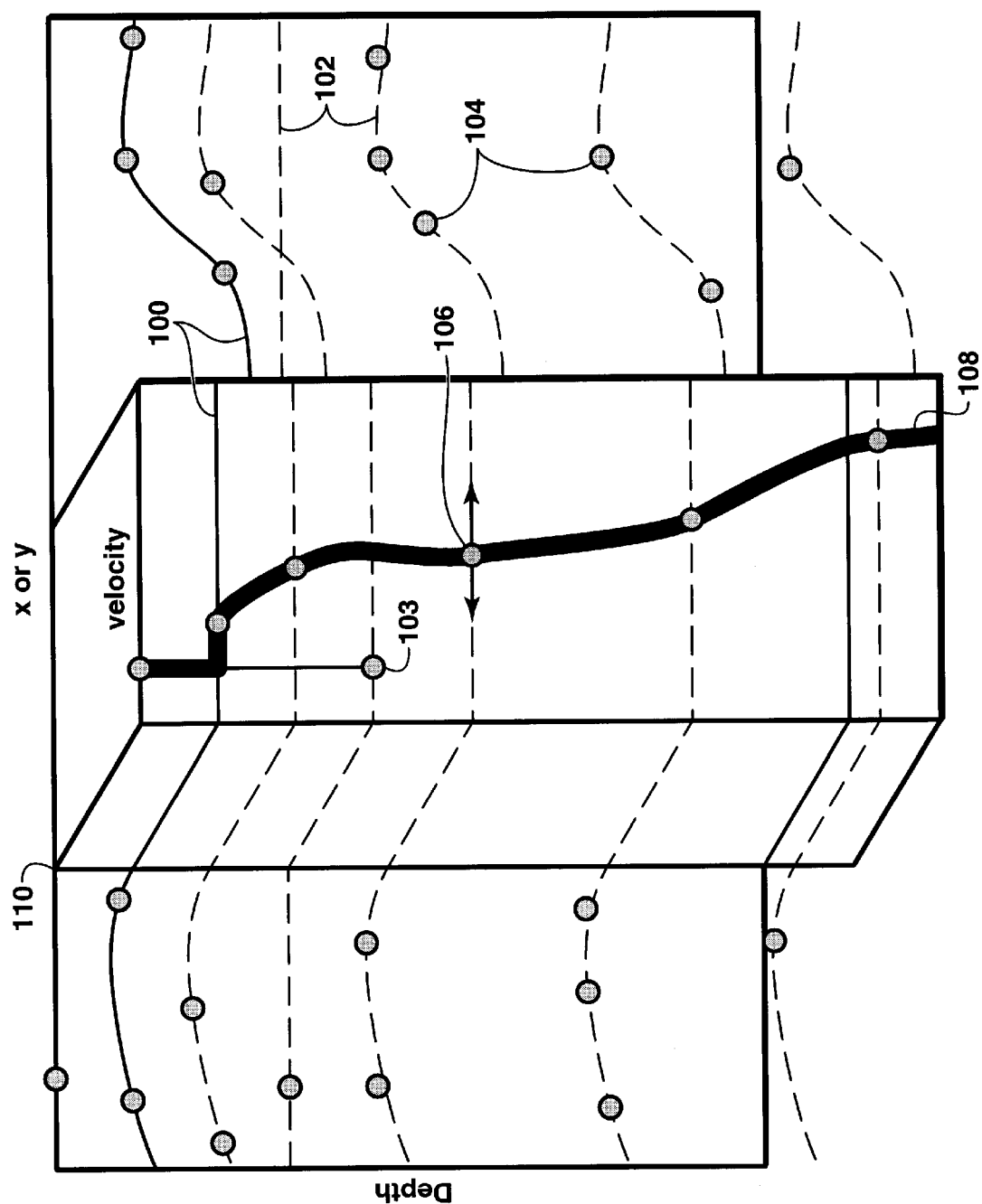
FIG. 2 is a schematic diagram of a cross-section from a 3-D velocity model generated by the present inventive method, showing the instantaneous velocity (bold curve in foreground) at one x-y location as a function of depth, and showing the surfaces used to control lateral variations in the velocity model in the background.

In a preferred embodiment, the velocity model has a set of parameters, which are illustrated in FIG. 2, consisting of the following three subsets:

1) One or more surfaces 100 representing any known, significant velocity discontinuities. These surfaces, called discontinuity surfaces, define regions ("velocity regions") within which the velocity is expected to be smooth, and across which the velocity is discontinuous. For example, in the Gulf of Mexico these surfaces would be the air-water surface, the water bottom, and the top and base of salt.

2) Each such velocity region has associated with it a limited number of velocity-node surfaces 102. These surfaces should approximate iso-velocity surfaces expected from a priori geologic information.

3) Each velocity-node surface contains a sparse set of user-selected velocity nodes 104, located on the velocity-node surfaces. These velocity nodes define the smooth velocity within each region defined by the discontinuity surfaces. The velocity nodes can be irregularly distributed along the surfaces.

At step 12 of FIG. 1, the user selects all of the above-described parameters and assigns numerical velocity values to the velocity nodes, which will be called "initializing" the velocity model. This is an exercise of the user's judgment using available geologic data. Better initialization means a quicker solution.

The discontinuity surfaces 100 and velocity-node surfaces 102 are used to encapsulate the a priori geologic information in the model. In particular, by making the velocity-node surfaces approximate what the iso-velocity surfaces can be expected to be, the velocity nodes associated with a particular velocity-node surface should have approximately constant velocity values. For example, in the Gulf of Mexico the velocity is known to be controlled mainly by compaction. This implies that the iso-velocity surfaces are approximately conformable with the water bottom surface. Therefore, when developing a velocity model for the Gulf of Mexico, the velocity-node surfaces should be selected to be conformable with the water bottom. The number and location of such surfaces will be selected based on the expected velocity differences between consecutive surfaces, recognizing that interpolation will be performed to determine velocity values at intermediate points.

"Velocity regions" are normally the zones between the discontinuity surfaces, or under the lowest discontinuity surface; however, a velocity region may be completely enclosed by a single discontinuity surface as in the case of a salt dome.

Figure 4A:
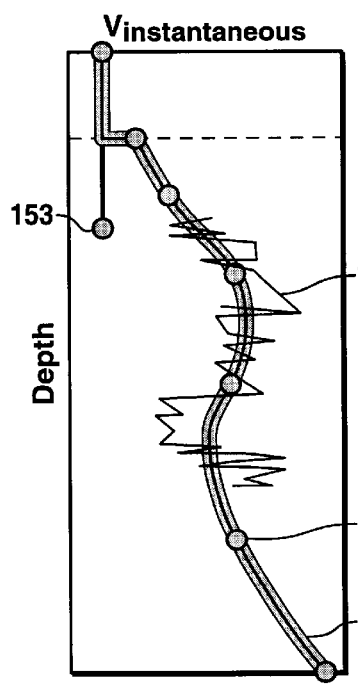
FIGS. 4A–4C is a schematic diagram for a user interface for making local comparisons of the migration velocity model with velocity information from (a) sonic logs, (b) vertical-checkshot data, and (c) surface seismic data.

Isovelocity surfaces and a nearby discontinuity surface will not always be the same shape. Thus, some or all of a velocity-node surface may lie outside of the velocity region for which it is constructed. This is illustrated in FIG. 2 by velocity node 103 which lies on a velocity-node surface which conforms to the air interface, depicted as flat in this instance, rather than to the rolling isovelocity surfaces characteristic of the velocity region below discontinuity surface 100. Velocity node 103 is an "orphan" node in that it won't be contained on the final velocity function 108. However, it does affect the final velocity function since it is used to vertically interpolate the velocity within the uppermost velocity region. The orphan node is also depicted in FIG. 4A, as indicated by arrow 153.

By using a sparse set of velocity nodes to define the smooth velocity within the model regions, one can accurately define a velocity model with very few parameters. This is especially true if the velocity-node surfaces closely approximate iso-velocity surfaces, because then very few velocity nodes, possibly only one, will be required to define the velocity along a velocity-node surface. These nodes provide an easy and intuitive way to adjust the velocity model 108. (See FIG. 2). The nodes may be displayed on an interactive graphics window, and their velocities may be changed by dragging them with a mouse, as indicated by arrow 106. This change in turn smoothly changes velocity function 108, which represents the instantaneous velocity plotted as a function of depth at x,y location 110.

Since the velocity model necessarily has a discrete set of parameters, it will be, without more, a discrete model. It is necessary to define a method for interpolating the velocity at a particular location in the model and thereby generate a continuous model. One reason this interpolation capability is needed is because the forward modeling, performed as part of the model building process, requires velocity values to be available at well-defined locations. Also, the eventual goal is to output a model that can be used in migration programs. These programs usually desire a model having velocity sampled on a uniform 3-D grid. At step 14 of FIG. 1, velocities are interpolated from the model in a preferred embodiment of the present invention as follows, using FIG. 2 again for reference:

1. Interpolate between the velocity nodes 104 laterally along each of the velocity-node surfaces 102. This produces laterally interpolated velocity nodes on each velocity-node surface at the x,y locations where a velocity value is desired. The interpolator should be constructed such that where a particular velocity-node surface contains only one velocity node, the interpolator would use the velocity value at the single node for all x,y locations on the velocity node surface. Interpolation can be performed using any interpolator that produces a smooth surface from data on an irregular grid. Examples of acceptable interpolators include the B-spline interpolator, the akima spline interpolator, and the interpolator contained in the commercial software product, Gocad with the Gocad interpolator currently considered preferable. Gocad is currently licensed by T-Surf Corporation of Houston, Tex.

2. At the desired x,y location, perform vertical interpolation of the laterally interpolated velocity nodes. This interpolation must be performed separately for the velocity nodes from different velocity regions. By way of example, a spline or Lagrange interpolator is satisfactory for this purpose with the Lagrange interpolator preferred among those tried to date.

3. Construct the final velocity function 108 at the x,y location 110, by merging the smooth velocity functions interpolated above (see the foreground display in FIG. 2). The discontinuity surfaces 100 are used to determine where to switch from one smooth velocity function to another. Usually this will result in velocity discontinuities at the depths of the discontinuity surfaces.

The main advantages of this velocity model are:

This model can represent the migration velocity using a very sparse set of velocity nodes, thus reducing the cost and time expended in picking velocities. This is because vertical and lateral interpolation is incorporated in the model, and because the lateral interpolation of velocity between velocity nodes takes place along surfaces that are close to iso-velocity surfaces.

It is easy to incorporate an interactive graphical method for updating the velocity model, also reducing the cost and time expended building a migration velocity model. This is achieved using an interactive display that shows the velocity nodes on a graph of instantaneous velocity versus depth. These nodes can be selected with the mouse and moved to a new velocity value.

Since this approach uses smooth interpolations that honor picked instantaneous velocity data points, it is easy to produce smooth models that fit the RMS velocity sweep information (or other available velocity information). In particular, the user has a greater degree of control on the model smoothness than would be possible by forcing smoothness by using simple smoothing operators.

Instantaneous velocity, along the velocity node surfaces, can be plotted as a surface in an (x,y, velocity) space. The user can adjust the velocity at locations along this surface using interactive 3D visualization techniques. This is especially useful in areas having poor seismic data quality, where the only control on the velocity may be the values in neighboring regions having good data quality.

This model representation allows the user to pick velocities at a sparse set of locations, then quickly interpolate between the picks. This is important for cost and time reduction of the model estimation process.

By using smooth interpolators, this model representation tends to produce smooth models within the regions defined by discontinuity surfaces. There is an important difference between the smoothing implicit in this model representation, and the smoothing performed in the conventional velocity model building method. In the conventional method, smoothing is only controlled by the filter operator length. These filter operators are usually constant over the entire survey area, since there is little diagnostic information that would allow one to pick more complicated operators. In the present model representation, smoothing is controlled by the number of velocity nodes picked. Thus, the user has direct control of the model smoothness, and it is easy to vary the smoothness to best match the velocity information.

The present invention is not limited to a certain range for the number of velocity nodes picked, but there are tradeoffs as the number is increased or decreased. More nodes give a better fit to actual data (as will be explained below) but produce a less smooth model.

Forward Modeling

At step 14 of FIG. 1, the instantaneous velocity model, discussed above, is converted to the domain in which the data were measured, a process which will be called forward modeling. The model and data are then compared in the data domain at all locations of interest (step 16). This comparison may involve more than one data domain because the user will want to compare the model to as many sources of measured data as are available. At step 18, the user examines the comparison and determines which of the initialized model parameters to vary to obtain the greatest improvement to model fit. For example, the velocity value at one of the velocity nodes might be changed. At step 20, the user makes this change to the chosen model parameter. At step 22, the forward modeling process of step 14 is repeated using the updated model parameters.

At step 24, the user compares model to measured data with respect to the change he has just made, i.e., a local comparison ignoring overall or "global" effects for the time being. If the local fit is still not satisfactory, the user cycles back to step 20 and repeats steps 20, 22, and 24. This cycling process concludes when satisfactory local fit is achieved and the user moves to step 26 and compares the modeled data to the measured data on a regional or global basis.

If the global (or regional) fit needs improvement, the user returns, to step 18 where he determines which parameter or parameters to adjust to make the most improvement on model fit. Steps 20, 22, 24 and 26 are then repeated until the global fit is deemed acceptable.

Persons skilled in the art will readily see flexibility in the above-described process. For example, the local comparison of model to measured data might suggest an adjustment to a different but neighboring parameter rather than further adjustment of the same parameter.

The forward modeling algorithm used depends upon the type of measurement being modeled. Forward modeling methods for four common data types are discussed below. Alternative forward modeling methods could be used to increase accuracy or efficiency.

Surface Seismic Data

Reflections in prestack-migrated common-midpoint (CMP) gathers are approximately hyperbolic in shape. Subsurface velocity is inferred from these gathers by measuring the curvature of these reflection hyperbolas. This curvature is approximately equal to the reciprocal of the root-mean-square (RMS) average of the instantaneous velocity at the CMP location.

One common way to measure the curvature of the reflection hyperbolas is to stack the CMP gather after applying moveout to the traces using a number of hypothetical values for the curvature. The traces will add in phase to produce relatively high amplitude when the hyperbolic curvature is close to the curvature of the reflection. The result of this analysis is often called a velocity spectrum. It produces a display of amplitude as a function of hyperbolic curvature and vertical traveltime.

Figure 3A:
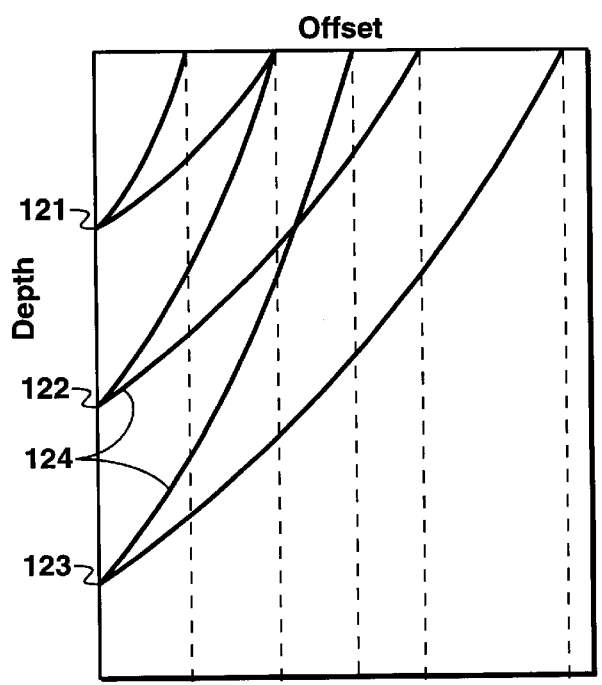
FIGS. 3A–3C is a schematic diagram of the way in which the present inventive method transforms the model velocities to the measured velocity domain for comparison with surface seismic data.
Figure 3B:
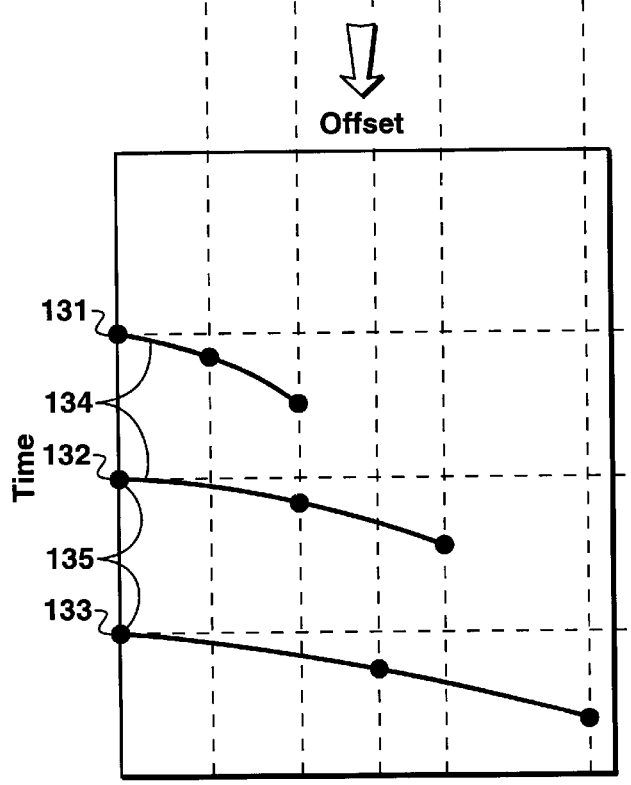
Figure 3C:
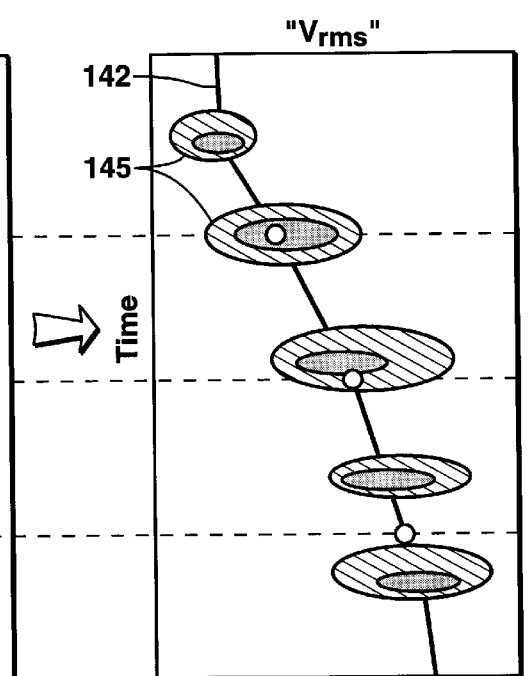

FIG. 3 is a schematic diagram of the preferred forward modeling technique that can be used when comparing the migration velocity model to velocity sweeps generated from surface seismic data. Forward modeling is performed as follows. In frame (A), several rays are traced from a number of depths (121, 122 and 123) to the surface. The instantaneous velocity model is used to determine the raypaths 124, which will be curved because the velocity changes with spatial position. These rays uniformly sample the emergence angles (the initial angle the ray makes with the vertical) from 0 to some maximum angle (usually 45 degrees). In frame (B), least squares hyperbolas 134 are fit to the ray traced traveltimes 135 as a function of ray offset at each depth level 121, 122, and 123 or, in the time domain: 131, 132 and 133. The square roots of the reciprocals of the curvature parameters for these hyperbolas are the "RMS" velocities 142 that are compared in-frame (C) to the velocity sweep data 145 in the form of contour plots of velocity spectra. The vertical times 131, 132 and 133 at which these "RMS" velocity values are plotted, are determined directly from the zero offset ray traveltimes. This velocity is here called the "RMS" velocity because, as thus determined, it is the velocity commonly known as the RMS velocity; however, time-weighted root-mean-square average velocities could be calculated directly from the velocity model data, but they would differ somewhat from the average velocities determined from the ray curvatures. It is the velocities determined from the curvatures of the reflection hyperbolas that are expected to match the velocities measured from surface seismic data.

Vertical-Checkshot Data

Forward modeling of vertical-checkshot data is simply a matter of tracing vertical ray paths in the instantaneous velocity model, starting at the depth of the checkshot receiver up to the surface. The traveltimes of these ray paths can be directly compared to the measured checkshot traveltimes.

Sonic Logs

Sonic logs directly measure instantaneous velocity. Thus, a direct comparison can be made of the present invention's instantaneous velocity model and sonic log velocities. Unfortunately, sonic log and surface seismic velocities are often inconsistent. This may be due to anisotropy, or to the fact that sonic logs are measured using waves having much higher frequencies than those used in surface seismic data. Thus, it would not be valid to try to force the migration velocity model to match sonic log velocities. Rather, sonic log velocities should be used for qualitative guidance concerning the gross features of the instantaneous velocity function. If anisotropy were included in the present invention's migration velocity model, as the reasonably skilled reader will readily be able to do, sonic logs may be of more quantitative value.

Offset-Checkshot Data

Offset-checkshot data measure traveltimes from some subsurface locations to a number of surface locations. Forward modeling of offset-checkshot data is simply a matter of ray tracing from the subsurface location to the surface locations of the measurements. The traveltimes of these ray paths can be directly compared to the measured offset-checkshot traveltimes.

Local Comparison of Model and Measured Data

Figure 4B:
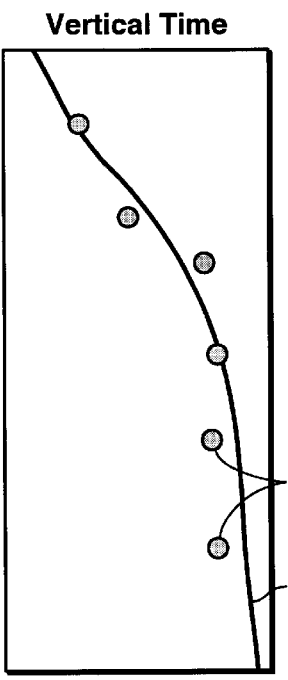
Figure 4C:
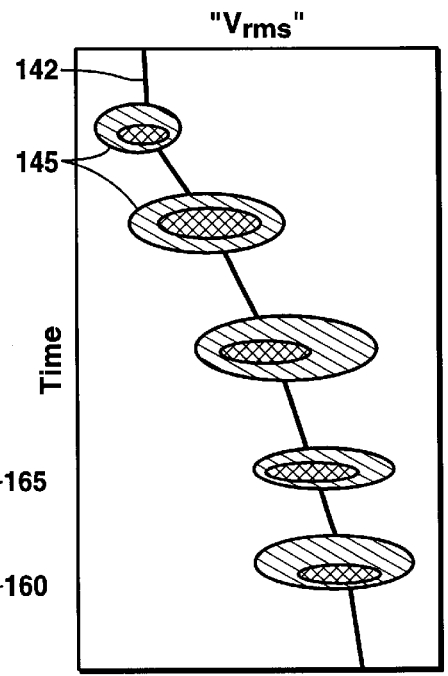

FIG. 4 is a schematic diagram for a user interface to compare the migration velocity model to measured velocity information at varying depths at one x,y location. Video monitor displays for this purpose can be created using, for example, an X-Windows software toolkit on a Unix workstation computer. In the display in panel (A), the model's instantaneous velocity function 155 is adjustable by dragging one or more of the velocity nodes 150 with the mouse. The modeled vertical traveltime function 160 in panel (B) and "RMS" velocity function 142 in panel (C) are automatically updated when the model velocity nodes are changed. In panel (A) the modeled data 155 are compared to actual data 158 in the form of sonic log data. In panel (B), the modeled traveltime function 160 is compared to measured traveltimes 165 from a vertical checkshot. In panel (C) the modeled "RMS" velocity function 142 is compared to actual surface seismic data 145 in the form of velocity sweep events. The user changes the instantaneous velocity function 155 until a good fit is obtained between the modeled and measured data in the three panels, or in as many panels as the user has actual data to check against. This interface is the preferred method among the several that can be used for adjusting the instantaneous velocity model.

Other interfaces could be used to make local comparisons of the model with velocity information. In particular, other model parameters (e.g., anisotropy) could be added to the interface, and other types of velocity information (e.g., CMP gathers) could be displayed.

Regional or Global Comparison of Model With Measured Data

The model building technique, illustrated in FIG. 4, requires a method for comparing the velocity model to measured velocity data over large regions or even globally. Conventional techniques for displaying surface seismic velocity sweeps show velocity sweep information from only one location, or velocity sweeps from several adjacent locations. When displaying information from adjacent locations, these locations are extracted either in the inline direction or the crossline direction. Regional or global comparison of a 3-D velocity model with velocity information requires the display of cubes of velocity information rather than single or adjacent locations.

Figure 5:
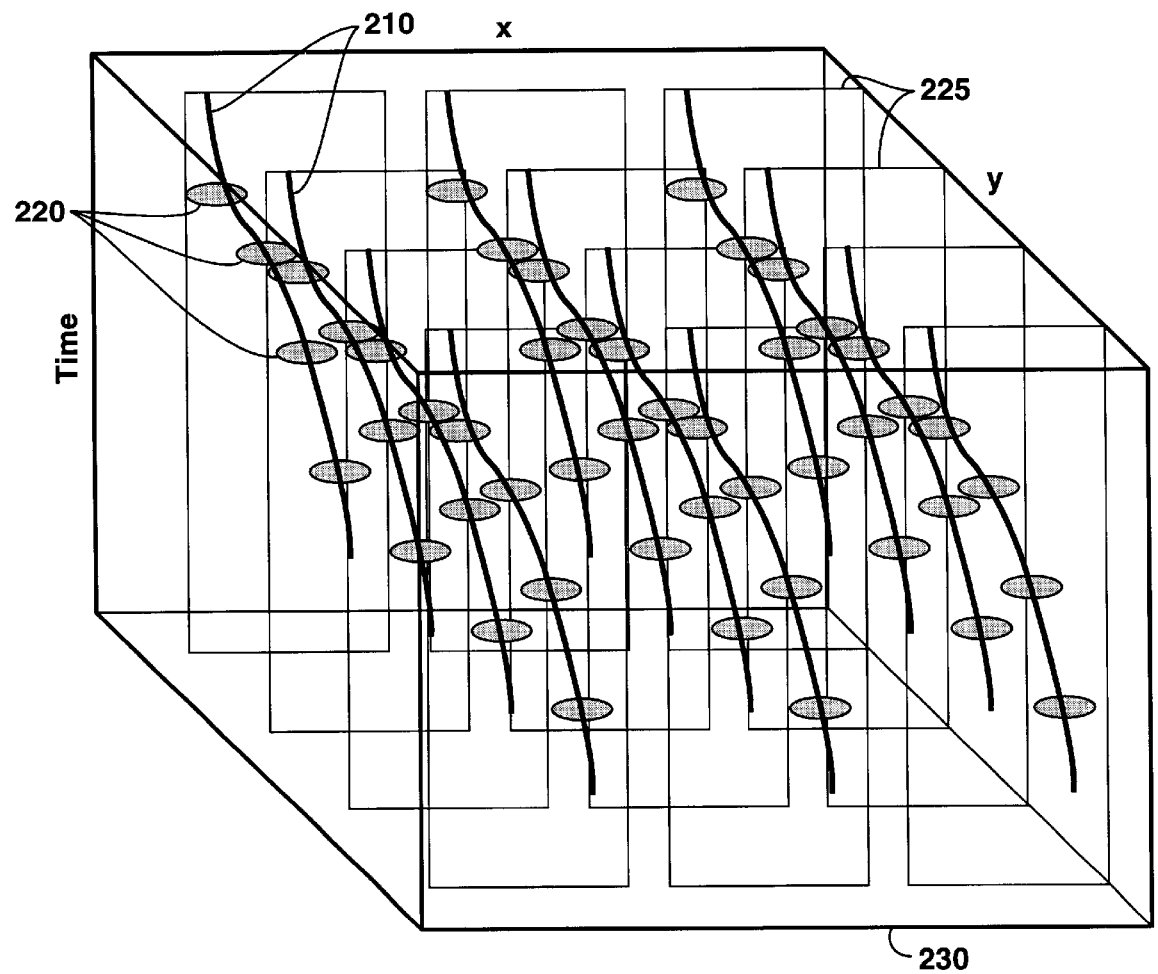
FIG. 5 is a schematic diagram of a 3-D velocity events display showing information from velocity sweep displays at their correct geographic locations and also displaying the model's predicted velocity functions for ready regional or global comparison with the velocity events derived from measured data.

Preferably, the invention also includes a 3-D velocity events display, illustrated in FIG. 5, for comparing model velocities, forward-modeled to "RMS" velocity functions 210, with velocity data 220 in the form (in this illustration) of velocity sweep events, all within a 3-D cube 230. Each of the individual velocity functions is essentially equivalent to the individual velocity functions shown in panel (C) of FIG. 3 and panel (C) of FIG. 4. The display shows such surface seismic velocity-sweep information from many locations simultaneously. Each location has its own scatterplot with coordinate axes 225 showing "RMS" velocity vs. time (depth). This information is presented in a geographically correct manner, i.e. velocity sweep information from consecutive crossline locations are located next to each other, while velocity sweep information from consecutive inline locations are located behind each other. Three-dimensional visualization software can readily be written by anyone skilled in the art, using available software tool kits such as Open Inventor marketed by Silicon Graphics, Inc., which can then be used to draw this display on the computer screen. The user can interactively rotate the display, or view it with stereo glasses such as the Crystal Eyes product marketed by Stereo Graphics Corp. of San Rafael, Calif., to better see the geographic nature of the display. Other types of velocity information, such as checkshot traveltimes from a number of wells, can be displayed in this manner. This 3-D events display can be used at steps 16, 24, and 26 in FIG. 1.

This display is used for several purposes including:

Fast quality control of the velocity model's fit to the velocity data.

Determination of which locations have the highest quality velocity sweep information.

Determination of the optimal location for model parameter adjustment, discussed further in the following section.

Determining Optimal Model Parameter for Adjustment (FIG. 1, Step 18)

Because of the way velocity model interpolation is done in the present invention, the most important locations (nodes) for adjusting velocities will usually be locations where the migration velocity model has the greatest deviation from the measured velocity data. It is also desirable to adjust at locations where the velocity information has good signal-to-noise ratio. The 3-D event display illustrated in FIG. 5 is the preferred way to quickly determine locations having these criteria. The user can then look at the local velocity comparison display for the selected location to update the model velocity nodes so that the model is consistent with all of the velocity data. (See FIG. 4.)

Further Discussion

The parameters that are adjusted and optimized in the above-described preferred embodiment are one or more of the node velocities. This is not intended to suggest that the user would never decide to adjust the initial selections of velocity node surfaces or velocity node locations, or other parameters that might be chosen. These are options that the user can consider and, in some cases, select.

Of particular note is the fact that there is no requirement for picking velocity values at every location where there is velocity data. Stated in previously used terms, each location where there is actual velocity data does not have to be a velocity node in the model. Instead velocity values are picked at a sparse set of locations, and the picked functions are interpolated between those locations as needed. The optimal locations for picking are determined using the 3-D velocity-events display of FIG. 5 as discussed above. Picking at only a sparse set of locations reduces the time required to develop a velocity model. Also, this technique will tend to produce models that are as smooth as possible while still being consistent with the measured velocity data.

It should be understood that the invention is not to be unduly limited to the foregoing, which has been set forth for illustrative purposes. Various modifications and alterations of the invention will be apparent to those skilled in the art without departing from the true scope of the invention, as defined in the following claims.

What is claimed is:

1. A method for constructing an instantaneous seismic velocity model for a designated subsurface region from available measured data, said method comprising the steps of:

(a) determining seismic velocity data for said designated subsurface region from said measured data, said seismic velocity data being associated with a certain domain;

(b) defining a discrete set of parameters to be used in said instantaneous velocity model;

(c) defining a method for interpolating said instantaneous velocity, between values generated from said velocity model, to produce a velocity value at any desired spatial location in said designated subsurface region;

(d) initializing said instantaneous velocity model;

(e) selecting a parameter from said set of parameters;

(f) adjusting said selected parameter;

(g) forward modeling from said instantaneous velocity model to predict velocity data in said domain; and (h) performing a comparison of said model-predicted velocity data with said velocity data determined from measured data and repeating steps (e)–(h) until said predicted velocity data approximates said measured velocity data.

2. The method of claim 1, wherein step (e) comprises the steps of forward modeling said initialized velocity model to predict-velocity data and then performing a global comparison of said model-predicted velocity data with said measured velocity data, from which comparison a model parameter is selected as likely to have a large beneficial impact on model fit if adjusted.

3. The method of claim 1, wherein said set of parameters is defined to comprise the following:

(a) at least one surface representing a known, significant velocity discontinuity, said surfaces defining velocity regions;

(b) at least one velocity-node surface within each of said velocity regions, said velocity-node surfaces being defined to approximate iso-velocity surfaces anticipated from known geologic information; and (c) at least one velocity node distributed on each of said velocity-node surfaces.

4. The method of claim 3, wherein said at least one velocity discontinuity surface constitute all known, significant velocity discontinuities in said designated subsurface region.

5. The method of claim 3, wherein said method for interpolating comprises the following steps:

(a) interpolating said velocity nodes laterally along the velocity-node surfaces to generate velocity values at desired x,y locations; and (b) performing vertical interpolations at any desired x,y location, interpolating between said laterally interpolated velocity nodes.

6. The method of claim 3, wherein said selected parameter is the velocity value at one of said velocity nodes.

7. The method of claim 1, wherein said selected parameter is a parameter likely to have a large favorable impact on said model's fit to said measured velocity data.

8. The method of claim 1, wherein said comparison in step (h) is performed using a 3-D interactive velocity events display.

9. The method of claim 1, wherein said available measured data are surface seismic data, said velocity data determined from said surface seismic data are the "RMS" velocities, and said model-predicted velocity data are calculated by measuring the curvature of reflection hyperbolas generated by said velocity model.

10. The method of claim 9, wherein said method of calculating"RMS" velocities from said model using said curvature of said reflection hyperbolas comprises making least-squares fits of hyperbolas to ray-traced traveltimes generated by said model and calculating said "RMS" velocity as the square root of the reciprocal of the curvature parameter for said hyperbolas.

11. The method of claim 1, wherein said available measured data are checkshot data, said velocity data determined from said checkshot data are measured checkshot traveltimes, and said model-predicted velocity data are traveltimes determined by tracing ray paths in said instantaneous velocity model, starting at the checkshot source and proceeding to the checkshot receiver.

12. A method for constructing an instantaneous velocity model for a designated subsurface region from available measured data, said method comprising the steps of:

(a) determining seismic velocity data for said designated surface region from said measured data, said seismic velocity data being associated with a certain domain;

(b) defining a discrete set of parameters to be used in said instantaneous velocity model;

(c) defining a method for interpolating said instantaneous velocity, between values generated from said velocity model, to produce a velocity value at any desired spatial location in said designated subsurface region;

(d) initializing said instantaneous velocity model;

(e) selecting a parameter from said set of parameters;

(f) adjusting said selected parameter;

(g) forward modeling from said instantaneous velocity model to predict velocity data in said domain;

(h) performing a local comparison of said model-predicted velocity data with said measured velocity data, and repeating steps (f)–(h) until said predicted velocity data approximate said measured velocity data on said local scale; and (i) performing a global comparison of said model-predicted velocity data with said measured velocity data, and repeating steps (e)–(i) until said model predicted velocity data approximate said measured velocity data globally.

13. The method of claim 12, wherein (a) said adjusting in step (f) and said local comparison in step (h) are performed using a video monitor display; and (b) said global comparison in step (i) is performed using a 3-D interactive velocity events display.

14. The method of claim 12, wherein said set of parameters is defined to comprise the following:

(a) at least one surface representing a known, significant velocity discontinuity, said surfaces defining velocity regions;

(b) at least one velocity-node surface within each of said velocity regions, said velocity-node surfaces being defined to approximate iso-velocity surfaces anticipated from known geologic information; and (c) at least one velocity node distributed on each of said velocity-node surfaces.

15. The method of claim 14, wherein said at least one velocity discontinuity surface constitute all known, significant velocity discontinuities in said designated subsurface region.

16. The method of claim 14, wherein said method for interpolating comprises the following steps:

(a) interpolating said velocity nodes laterally along the velocity-node surfaces to generate velocity values at desired x,y locations; and (b) performing vertical interpolations at any desired x,y location, interpolating between said laterally interpolated velocity nodes.

17. The method of claim 14, wherein said selected parameter is the velocity value at one of said velocity nodes.

18. The method of claim 12, wherein said selected parameter is a parameter likely to have a large favorable impact on said model's fit to said measured velocity data.

* * * * *